United States Patent [19]
Amo et al.

[11] Patent Number: 6,013,145
[45] Date of Patent: Jan. 11, 2000

[54] METHOD OF CURING AN OPTICAL DISC

[75] Inventors: Mikuni Amo; Masami Inouchi, both of Tokushima-ken, Japan

[73] Assignee: Kitano Engineering, Co., Ltd., Tokushima-ken, Japan

[21] Appl. No.: 09/076,144

[22] Filed: May 11, 1998

Related U.S. Application Data

[62] Division of application No. 08/708,079, Aug. 30, 1996, Pat. No. 5,779,855.

[30] Foreign Application Priority Data

Aug. 30, 1995 [JP] Japan ..................................... 7-243951

[51] Int. Cl.[7] ..................................................... B32B 31/28
[52] U.S. Cl. ..................... 156/74; 156/273.7; 156/275.5; 156/275.7; 369/286
[58] Field of Search ............................. 156/272.2, 273.7, 156/275.5, 275.7, 74; 369/286; 428/65.2

[56] References Cited

U.S. PATENT DOCUMENTS

| | | | |
|---|---|---|---|
| 4,877,475 | 10/1989 | Uchida et al. | 156/275.7 |
| 4,990,208 | 2/1991 | Kano | 156/275.3 |
| 5,364,256 | 11/1994 | Lipscomb et al. | |
| 5,597,519 | 1/1997 | Martin et al. | |
| 5,716,761 | 2/1998 | Iida et al. | 156/74 |
| 5,785,793 | 7/1998 | Arai et al. | 156/275.7 |

*Primary Examiner*—Michael W. Ball
*Assistant Examiner*—Michael A. Tolin
*Attorney, Agent, or Firm*—Flynn, Thiel, Boutell & Tanis, P.C.

[57] ABSTRACT

There is provided a method of curing an optical disc capable of effectively curing the optical disc without generating a warp phenomenon when optical disc is cured while ultraviolet curing resin material is irradiated with ultraviolet. The method of curing an optical disc comprises overlaying first and second resin substrates onto each other by way of an adhesive made of ultraviolet curing resin material, the method further comprising clamping the optical disc by ultraviolet transmittance plates at both sides thereof, and curing the adhesive while being irradiated with ultraviolet from outside of the ultraviolet transmittance plates.

11 Claims, 6 Drawing Sheets

STEP (1)     STEP (2)     STEP (3)     STEP (4)     STEP (5)

METHOD OF CURING AN OPTICAL DISC

This is a division of Ser. No. 08/708,079, filed Aug. 30, 1996, now U.S. Pat. No. 5,779,855.

BACKGROUND OF THE INVENTION

1. Field of the Invention

The present invention relates to a method of and an apparatus for curing an optical disc (hereinafter referred to as an optical disc curing method and an optical disc curing apparatus), particularly to a method of and apparatus for curing an optical disc comprising first and second resin substrates which are overlaid with each other by way of an adhesive.

2. Prior Art

Computers have been now used in various fields, and they have a leap forward in development of processing capacity and speed. Particularly, storage density of memories to be used has improved dramatically, impacting daily life to change a common sense in the daily life. Among memories, a so-called storage disc, particularly, an optical disc is convenient to be carried and has various uses as storage means.

The optical disc is preferably formed of a discoid substrate made of synthetic resin such as polycarbonate.

Signal pits that are information signals, hereinafter referred to as information, are stored in the resin substrate, and a reflecting film made of aluminum or the like is formed on the resin substrate. A protecting resin layer made of, e.g., ultraviolet curing resin (so-called ultraviolet resin) is formed on the reflecting film for protecting the resin substrate in which information is stored.

Whereupon, a thickness of the resin substrate is set to 0.6 mm in view of the recording of the signal pits, the manufacturing limits, and strength of the resin substrate.

Since a CD has a thickness of about 1.2 mm as its standard, it is very useful for two resin substrates to be bonded to each other by an adhesive to conform to the thickness of the CD.

An optical disc D shown in FIG. 5 typically comprises a first resin substrate U1 composed of a resin substrate in which information is having a reflection film a and a protecting resin layer b formed on the reflecting film a, and a second dummy resin substrate U2 in which no information is stored, wherein the second dummy resin substrate U2 is bonded to the first resin substrate U1.

An optical disc D shown in FIG. 6 comprises two resin substrates in which different information is stored are bonded to each other.

The optical disc D in FIG. 6 comprises first and second resin substrates U1 and U2 each composed of a resin substrate in which information is stored having a reflection film a formed on the resin substrate and a protecting resin film a formed on the reflecting film a, wherein the first and second resin substrates U1 and U2 are bonded to each other by way of an adhesive R.

The optical disc having both resin substrates in which information is inputted is largely expected hereinafter as a digital video disc (DVD) sometimes referred to as a digital versatile disc. Whereupon, the inventors of the present application manufacture the optical disc in the following manner.

FIGS. 7 (1) through (5) show schematic views for explaining the processes to manufacture the optical disc D by bonding two resin substrates. These procedures are now briefly described in the order of the procedures.

First, a first resin substrate U1 in which information is stored is placed on a receiving table S (Process 1).

The receiving table S has a boss at the center thereof for positioning the resin substrate U1 and is rotatable at high speed (a boss is omitted in FIG. 7). Successively, the first resin substrate U1 is placed on the receiving table S, and an adhesive R such as ultraviolet curing resin, etc. on the first resin substrate U1 (Process 2).

When the ultraviolet curing resin is used as the adhesive R, coating is placed onto the first resin substrate U1 by way of a nozzle so as to pour the adhesive R therefrom onto the first resin substrate U1. For example, if a jet nozzle N is moved in a state where the first resin substrate U1 is turned, the adhesive R can be coated onto the first resin substrate U1 in a doughnut shape. After the adhesive R is coated onto the first resin substrate U1, the second resin substrate U2 can be overlaid on the first resin substrate U1 (Process 3).

Thereafter, the overlaid two resin substrates are integrally turned at high speed (Process 4).

That is, the adhesive interposed between the first and second resin substrates U1 and U2 is developed to extend uniformly between the first and second resin substrates U1 and U2.

Air sealed between the first and second resin substrates are blown off in a state where both resin substrates are overlaid onto each other during rotation. Further, an air bubble which is contained in the adhesive per se, if any, also escapes outside the adhesive.

In the developing process, a large quantity of the adhesive R interposed between both resin substrates is scattered from the circumferential peripheries of both resin substrates when the receiving table S is turned at high speed. Although the developing time is several seconds, the adhesive is strongly scattered at an acceleration time, before the rotating speed is changed to a high rotating speed, namely, within one to two seconds of several seconds of the developing time.

After the adhesive R is developed, it is cured in the next process. When the ultraviolet curing resin is used as the adhesive R, the resin is irradiated with ultraviolet radiation (hereafter ultraviolet) which is irradiated from the upper portion of the second resin substrate. When the ultraviolet curing resin is cured upon reception of the ultraviolet so that the first and second resin substrates U1 and U2 are integrated with each other, thereby forming a strongly bonded optical disc.

The inventors of the present application have manufactured the optical disc by bonding the first and second resin substrates in the manner as set forth above.

Meanwhile, when the adhesive is cured, the optical disc is placed on the receiving table and it is irradiated with the ultraviolet from the upper portion of the optical disc, it is understood that the optical disc is subject to a warp phenomenon, namely, it is liable to be warped.

That is, if the optical disc comprises both resin substrates in which information is respectively stored or even if it comprises both resin substrates in any of which information is stored, when the adhesive is cured when it is irradiated with the ultraviolet from, e.g., the upper portion of the resin substrates, a warp phenomenon is generated, namely, the optical disc per se is bent upward.

The optical disc which was subject to the warp phenomenon, namely, the warped optical disc is deteriorated in quality, and hence the warp phenomenon must be avoided.

On the other hand, when the optical disc is manufactured, the curing time must be as short as possible to enhance the productivity. Accordingly, the intensity of the ultraviolet is increased so as to cure the adhesive. However, when the intensity of the ultraviolet is increased, we found that there was a tendency that the optical disc was largely warped. As a result, in the conventional curing method, there is a limit to expedite the curing speed, leading to deterioration of productivity.

SUMMARY OF THE INVENTION

The present invention has been made to solve the aforementioned problems. That is, the inventors of the present application endeavored themselves to study these problems and discovered that the adhesive could be effectively cured and the warp phenomenon is prevented if the adhesive is irradiated with ultraviolet not from one side thereof but from both sides thereof. Further, they discovered that the warp phenomenon was more surely prevented if the optical disc can be clamped and held by members which can sufficiently transmit light therethrough and hold the optical disc from both sides thereof. As a result, the present invention has been completed.

It is an object of the present invention to provide a method of and an apparatus for curing an optical disc capable of effectively curing the optical disc without generating a warp phenomenon when the optical disc is irradiated with ultraviolet to thereby cure a ultraviolet curing resin.

To achieve the above object, it is a first aspect of the invention to provide a method of curing an optical disc comprising overlaying first and second resin substrates onto each other by way of an adhesive made of ultraviolet curing resin material, the method further comprising clamping the optical disc by ultraviolet transmittance plates at both sides thereof, and curing the adhesive while being irradiated with ultraviolet from outside of the ultraviolet transmittance plates.

It is a second aspect of the present invention to provide a method of curing an optical disc comprising overlaying first and second resin substrates onto each other by way of an adhesive made of ultraviolet curing resin material, the method further comprising clamping the optical disc by ultraviolet transmittance plates at both sides thereof, moving the optical disc between ultraviolet irradiators while the optical disc is clamped by the ultraviolet transmittance plates at both sides thereof, and curing the adhesive while being irradiated with ultraviolet from outside of the ultraviolet transmittance plates.

It is a third aspect of the present invention to provide a method of curing an optical disc according to the second aspect of the invention, wherein the optical disc is horizontally turned and is moved together with the ultraviolet transmittance plates.

It is a fourth aspect of the present invention to provide a method of curing an optical disc according to the second aspect of the invention, wherein the optical disc is moved together with ultraviolet transmittance plates while the optical disc and the ultraviolet transmittance plates are placed on a receiving platform.

It is a fifth aspect of the invention to provide an apparatus for curing an optical disc comprising first and second resin substrates, the first resin substrate being overlaid on the second resin substrate by way of an adhesive, two ultraviolet transmittance plates for clamping the optical disc therebetween, a base table for supporting the two ultraviolet transmittance plates, a conveying means for moving the base table, and an ultraviolet irradiators for irradiating the optical disc on the base table with ultraviolet from both sides thereof.

It is a sixth aspect of the invention to provide an apparatus according to the fifth aspect of the invention, wherein the base table has a doughnut shape and a hole formed by boring a center thereof (hereinafter referred to as a bore portion) wherein the ultraviolet irradiators irradiate ultraviolet which passes through the bore portion.

It is a seventh aspect of the invention to provide an apparatus according to the fifth aspect of the invention, wherein the conveying means is a conveyor for conveying the base table while placing the base table thereon.

It is an eighth aspect of the present invention to provide an apparatus according to the seventh aspect of the invention, wherein the conveyor includes two endless belts, the two belts being differentiated in velocities thereof, and wherein the base table is turned owing to the difference of velocities.

It is a ninth aspect of the invention to provide an apparatus according to the fifth aspect of the invention, wherein the ultraviolet transmittance plates are respectively formed of quartz glass.

BRIEF DESCRIPTIONS OF THE DRAWINGS

PREFERRED EMBODIMENT OF THE INVENTION

Figure 1:
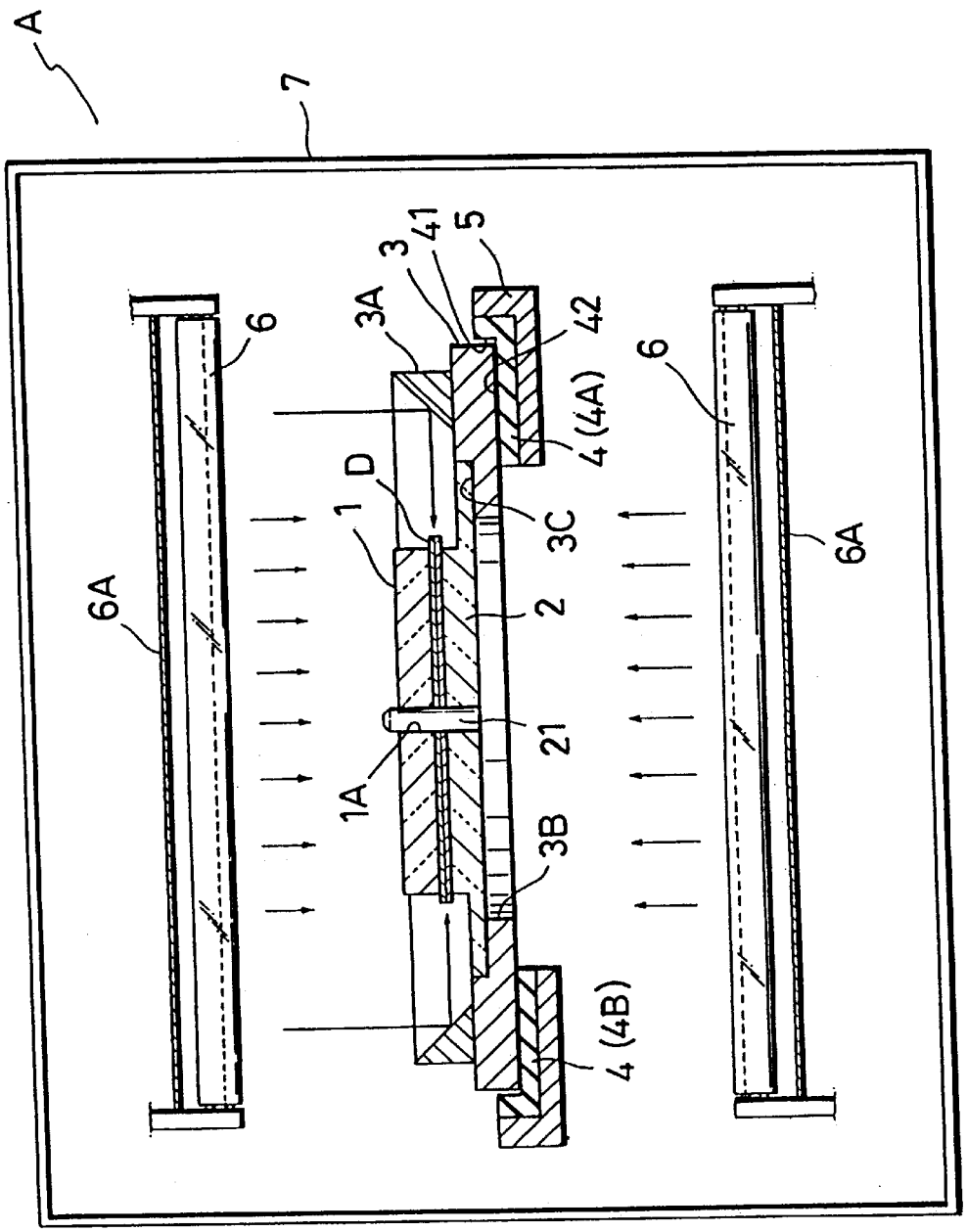
FIG. 1 is an enlarged perspective view showing a main portion of an optical curing apparatus according to a first aspect of the invention.

First Embodiment (FIGS. 1–6):

FIG. 1 is an enlarged perspective view showing a main portion of an optical disc curing apparatus according to a first embodiment of the invention.

The optical disc curing apparatus mainly comprises a first apparatus having a function to irradiate ultraviolet, and a second apparatus for permitting the optical disc to pass through an irradiation area Z where the optical disc is irradiated with ultraviolet.

The first apparatus comprises mainly a plurality of ultraviolet irradiators 6 and a cover body 7 for surrounding the ultraviolet irradiators 6, wherein an area between these irradiators 6 is called as the irradiation area Z of the ultraviolet.

Cooling means or partition boards, not shown, may be provided inside the cover body 7 to effectively irradiate ultraviolet.

The cooling means are provided for restraining heating of the irradiators 6, for example, means for blowing cold air in the cover body 7 through ventilation ports F.

The second apparatus comprises a placing/moving means disposed in the irradiation area Z of the ultraviolet.

The ultraviolet irradiators 6 irradiate ultraviolet, whereby an adhesive interposed between both resin substrates of the optical disc D, namely, a ultraviolet curing resin is irradiated with the ultraviolet and is cured.

Reflecting plates 6A are normally provided at the back surfaces of the ultraviolet irradiators 6 for effectively irradiating the ultraviolet.

The ultraviolet irradiators 6 are appropriately disposed so that the optical disc, which is placed on the belt conveyor, described later, can be irradiated with ultraviolet from the upper and lower sides thereof.

The placing/moving means comprises a pair of ultraviolet transmittance plates 1 and 2 for clamping the optical disc D, a base table 3 on which the ultraviolet transmittance plates 1 and 2 are placed, and a belt conveyor 4 for conveying the base table 3 while the base table 3 is placed thereon.

The ultraviolet transmittance plates 1 and 2 are respectively formed of material which sufficiently transmits ultraviolet, for example, they are preferable to be formed of heat-resistant plates such as quartz glass plates and PYREX (trademark) glass.

The ultraviolet transmittance plates 1 and 2 clamp the optical disc D from the upper and lower sides thereof, and they preferably have diameters which are respectively the same as or slightly less than diameter of the optical disc.

The base table 3 is a table on which ultraviolet transmittance plates 1 and 2 are placed, and has a recess 3C, and it has a doughnut shape a center of which is bored.

A reflecting member 3A is provided on the base table 3, and it reflects the ultraviolet and effectively cures the peripheral end portion of the optical disc which is relatively difficult to cure.

The base table 3 may be formed by fixing a separately manufactured reflecting member of 3A thereto or by integrally fixing the reflecting member 3A thereto.

The lower ultraviolet transmittance plate 2 comprises a large diameter portion and a small diameter portion wherein the large diameter portion is fitted in the recess 3C of the base plate 3 so that the plate 2 is supported by the base plate 3.

The lower ultraviolet transmittance plate 2 has a boss 21 at the center thereof for positioning the ultraviolet transmittance plate 2, and the boss 21 is preferably formed of the same material as the ultraviolet transmittance plate 2.

The upper ultraviolet transmittance plate 1 is formed in a discoid shape for clamping the optical disc D between itself and the lower ultraviolet transmittance plate 2 utilizing its weight. It is preferable that the diameter of the upper ultraviolet transmittance plate 1 is the same as the small diameter portion of the lower ultraviolet transmittance plate 2.

If the central portion or adjacent portion thereof is pressed in an extreme way, the optical disc is prevented from being warped to some extent, there may be employed the upper ultraviolet transmittance plate 1 having a small diameter capable of pressing the central portion alone.

In this case, it is also possible to use a metallic ring (made of stainless steel sheet and having a thickness of 10 mm and an outer diameter of 3 mm) sufficiently serving as a weight instead of the upper ultraviolet transmittance plate 1 having the small diameter.

The upper ultraviolet transmittance plate 1 has a central bore portion 1A through which the boss 21 of the ultraviolet transmittance plate 2 is inserted. To set the optical disc D on the base table 3, the lower ultraviolet transmittance plate 2 is first engaged in the recess 3C of the base table 3. Then the optical disc D is placed on the ultraviolet transmittance plate 2 while the boss 21 is inserted into the central bore portion 1A of the optical disc D.

Successively, the ultraviolet transmittance plate 1 is placed on the optical disc D while the boss 21 is inserted into the central bore portion 1A of the ultraviolet transmittance plate 1. In this state, the optical disc D is clamped between the upper and lower ultraviolet transmittance plates 1 and 2 from the upper and lower sides thereof, and it is set on the base table 3. At this time, the peripheral edge of the optical disc D slightly protrudes outside from the ultraviolet transmittance plates 1 and 2.

Since the base table 3 has the doughnut shape, the optical disc is irradiated with the ultraviolet through the bored portion 3B of the base table 3.

Accordingly, the optical disc D is irradiated with ultraviolet from the upper side of the upper ultraviolet transmittance plate 1 and the lower side of the lower ultraviolet transmittance plate 2, whereby it can be uniformly irradiated, and hence the warp phenomenon can be prevented.

Further since the optical disc D is clamped by the ultraviolet transmittance plates 1 and 2, the warp phenomenon is more surely presented. On the other hand, the belt conveyor 4 is a conveying means for conveying the base table 3 while the base table 3 is placed thereon, and it comprises a pair of belts 4A and 4B each having small width and a pair of guides 5, which are respectively spaced from each other.

The guides 5 guide and support the pair of belts 4A and 4B. The belts 4A and 4B have respectively stepped portions, and supporting surfaces 42 for supporting the base table 3 and surfaces 41 for preventing the base table 3 from being laterally vibrated.

The belts 4A and 4B are usually set in such a manner that one of them travels faster than the other. Accordingly, the base table 3 placed on the belt conveyor 4 can perform rotary motion owing to the difference of velocities between the belts 4A and 4B when it is moved while being supported by the belts 4A and 4B.

Figure 2:
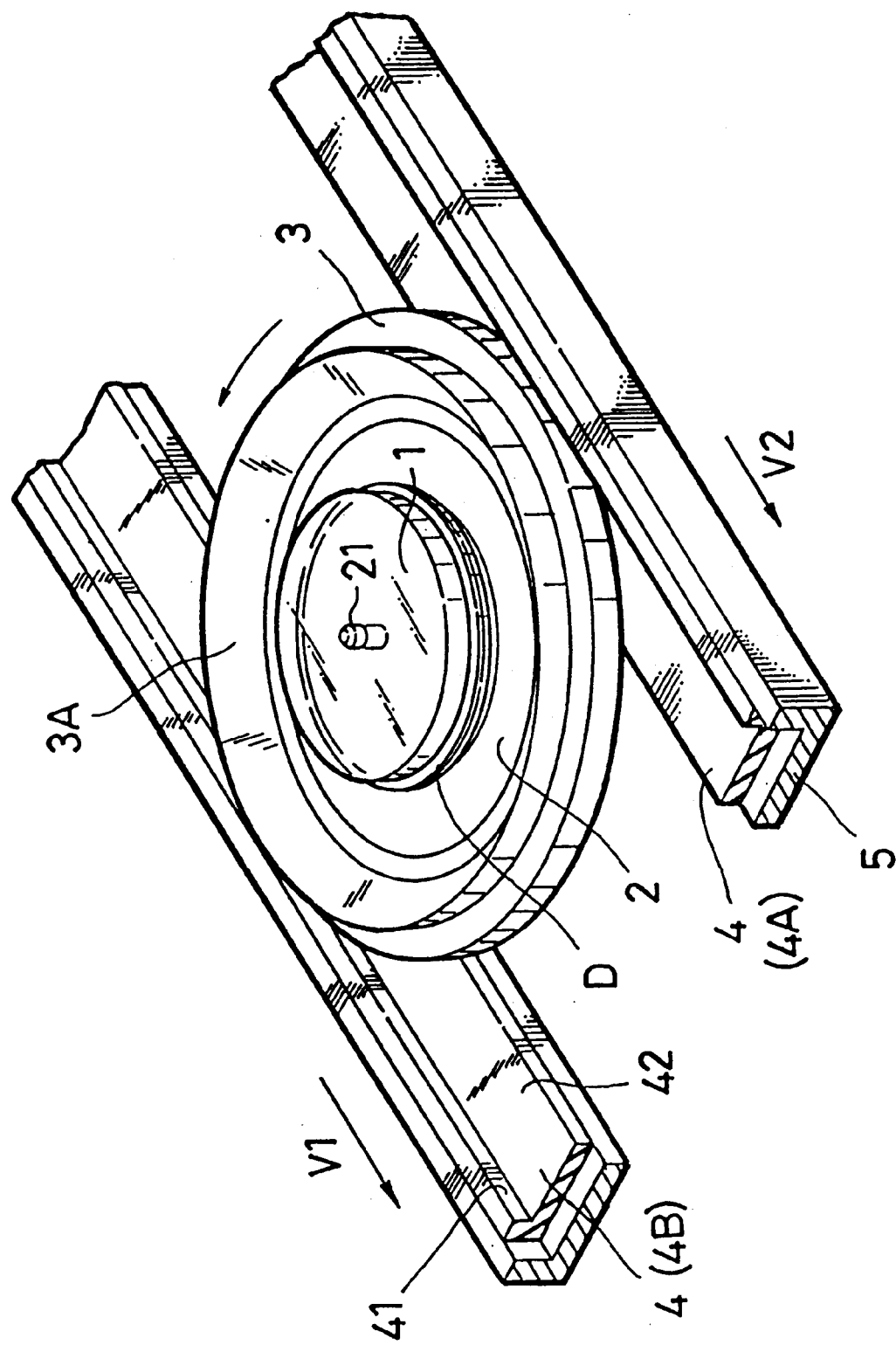
FIG. 2 is a view for explaining rotation of an optical disc of the optical curing apparatus in FIG. 1.

FIG. 2 is a view for explaining the rotation of the base table 3. Suppose that the velocity V1 of the belt 4B is greater than the velocity V2 of the belt 4A, the base table 3 is turned counterclockwise while the optical disc D is placed thereon.

Meanwhile, it is needless to say that the greater the difference of velocities, the faster the rotating velocity, and if both velocities are equal to each other, the rotating velocity becomes zero.

In the ultraviolet irradiation area Z, the optical disc D is irradiated uniformly with the ultraviolet owing to the rotary motion of the base table 3.

Figure 3:
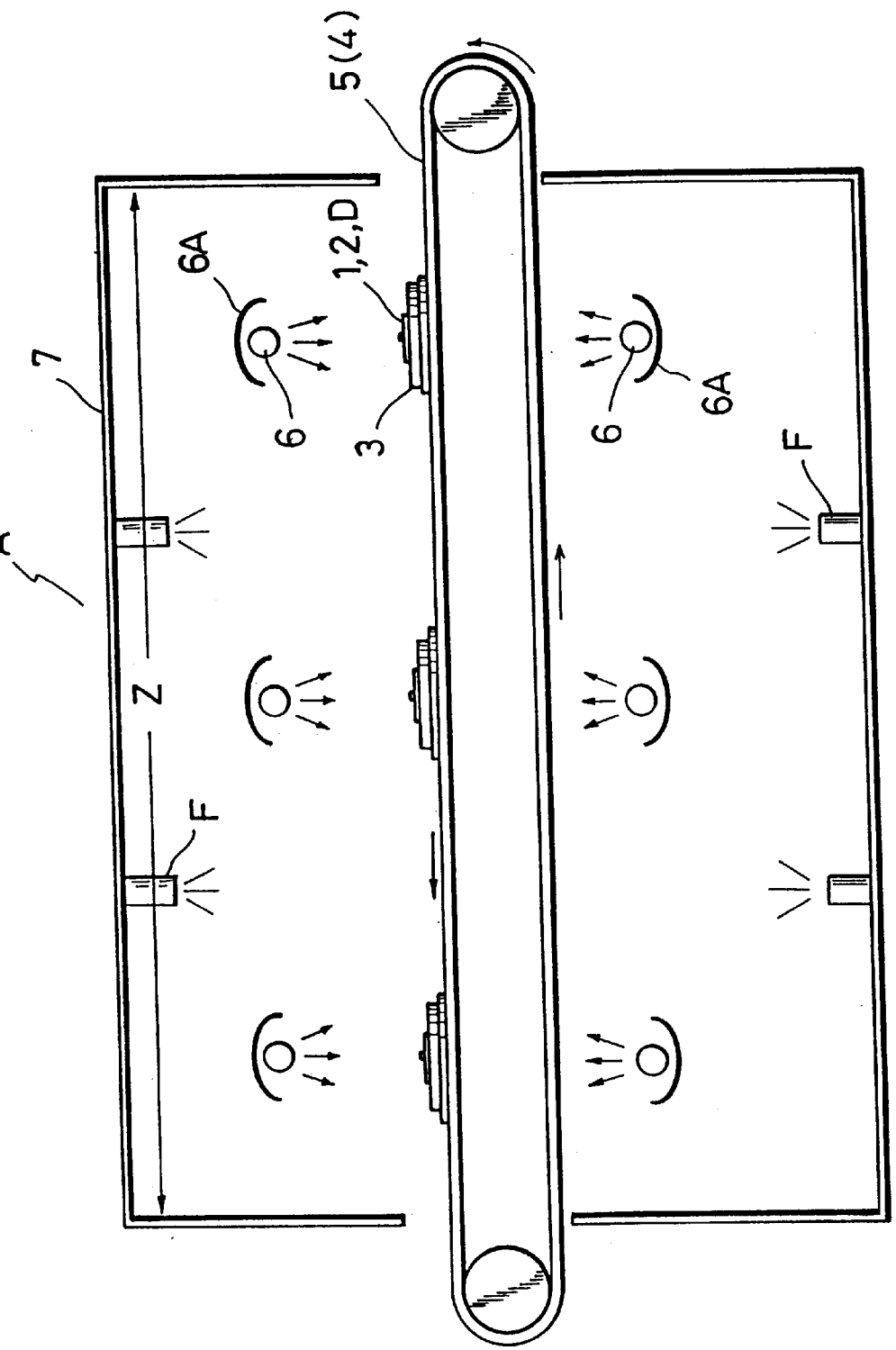
FIG. 3 is a perspective side view of the optical disc curing apparatus in FIG. 1.

FIG. 3 is a schematic side view of the optical disc curing apparatus.

In the first step, the optical disc D is clamped by the ultraviolet transmittance plates 1 and 2 from the upper and lower sides thereof and it is placed on the base table 3. In this state, the optical disc D is placed on the belt conveyor 4 of the optical disc curing apparatus and is moved by the belt conveyor 4. Thereafter the optical disc D is conveyed at a given speed in a ultraviolet irradiation area Z surrounded by the cover body 7.

In the cover body 7, air current is generated owing to a cold air blown out from the ventilation ports F.

However, since the upper ultraviolet transmittance plate 1 is placed on the optical disc D, the optical disc is neither blown up nor lifted up.

The optical disc D is irradiated with the ultraviolet by the plurality of ultraviolet irradiators 6 from the upper and the lower sides thereof while it is conveyed. It is needless to say that the ultraviolet irradiators 6 may be arranged in parallel with the moving direction of optical disc D although they are arranged perpendicularly with respect to the moving direction of the optical disc D.

Intensity of the ultraviolet which is irradiated vertically from the ultraviolet irradiators 6 is needed to be adapted for the substrate characteristics of the first resin substrate or the second resin substrate, and hence it is preferable that each of the ultraviolet irradiators 6 can be adjusted so that intensity of ultraviolet adjusted.

While the optical disc D passes through the ultraviolet irradiation area Z, the ultraviolet curing resin is gradually cured by the ultraviolet. The ultraviolet curing resin is substantially completely cured at the time when the optical disc D passed through the ultraviolet irradiation area Z.

Since the optical disc D is irradiated with the ultraviolet not only from one direction but also from two directions, i.e., from the upper and the lower sides thereof, it is possible to prevent the optical disc D from being warped. Since the optical disc D is clamped by the ultraviolet transmittance plates 1 and 2 from both sides thereof, the warp phenomenon can be more effectively prevented.

Figure 4:
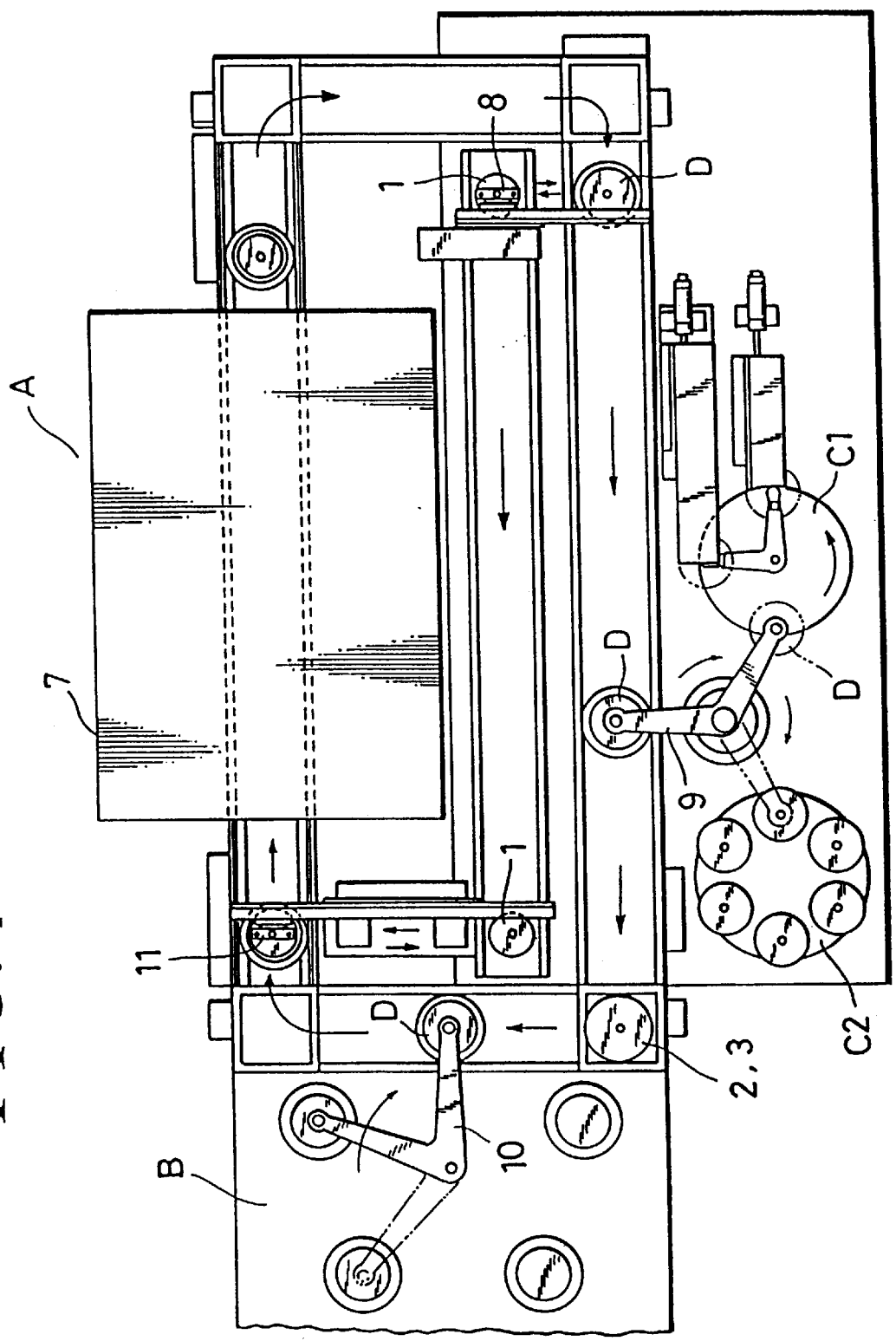
FIG. 4 is a view showing positioning of the optical disc curing apparatus with reference to former and latter processes of the entire process of an optical disc curing method.
Figure 5:
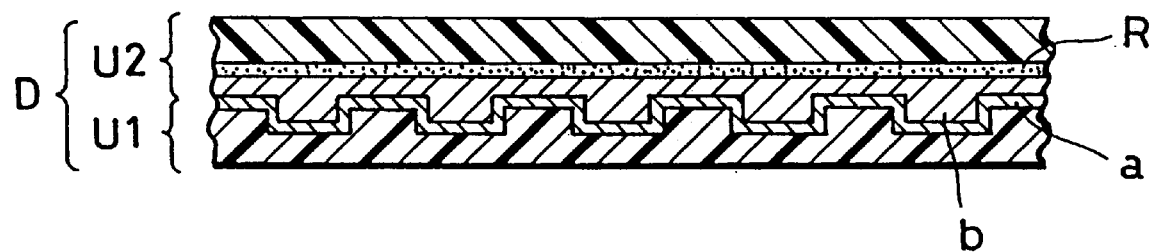
FIG. 5 is a view showing the optical disc where information is stored in one of resin substrates.

FIG. 4 shows an optical disc curing apparatus A which is illustrated with association of former and latter processes of the optical disc curing method. An optical disc manufacturing apparatus B is disposed in front of the optical disc curing apparatus A for performing processes before the ultraviolet curing resin of the optical disc is cured.

Figure 6:
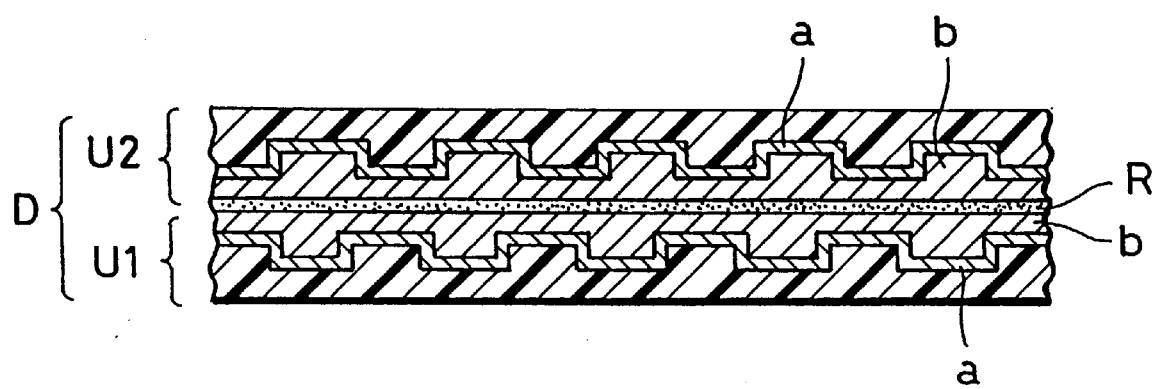
FIG. 6 is a view showing the optical disc where information is stored in both of the resin substrates.
Figure 7:
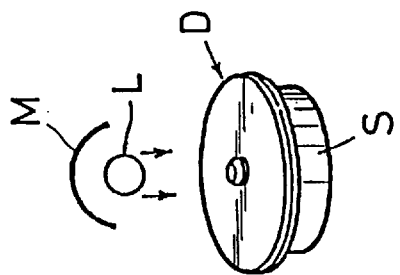
FIG. 7 is a perspective view showing processes for manufacturing the conventional optical disc.
Figure 7:
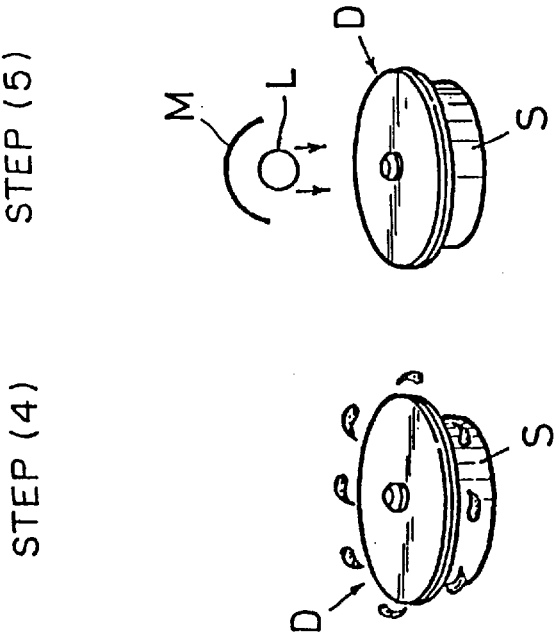
Figure 7:
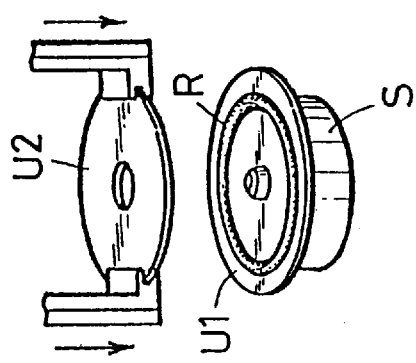
Figure 7:
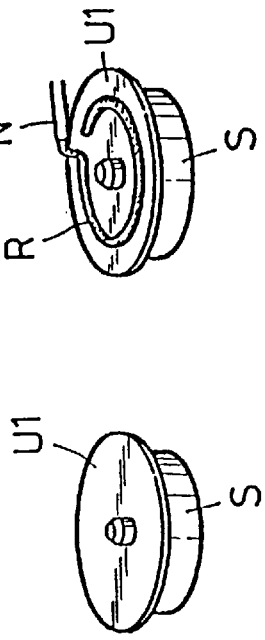

The optical disc manufacturing apparatus B performs the processes 1 through 4 as explained in FIG. 6. That is, the processes of placing the first resin substrate on the receiving table, applying the adhesive on the first substrate, overlaying the second resin substrates onto the first substrate, and developing the adhesive, etc.

Although the optical disc D is supplied from the optical disc manufacturing apparatus B to the optical curing apparatus A, the optical disc D is delivered to the optical curing apparatus A while it is clamped by the ultraviolet transmittance plates 1 and 2 and held on the base table 3. After the optical disc D is completely cured by the optical curing apparatus A, it is moved to the next process by the conveyor body, then the upper ultraviolet transmittance plate 1 is removed from a lateral moving take up chuck 8. The removed ultraviolet transmittance plate 1 is bypassed from the main stream of the process and is also conveyed in front of the optical disc manufacturing apparatus B by another conveyor body.

The optical disc D is taken out by a rotary motion take out chuck 9 from the upper portion of the base table 3 from which the ultraviolet transmittance plate 1 is removed. The thus taken out optical disc is delivered to a test table C1. In the test table C1, the optical disc is subject to a given test, and then the tested optical disc is accommodated into a stack of an accommodation table C2.

Thereafter, the optical disc D is taken out from the stack and is conveyed to a portion where a casing process, not shown, is performed.

On the other hand, the base table 3 from which the optical disc D is taken out (in a state where the lower ultraviolet transmittance plate 2 is engaged in the base table 3) is transferred to the optical disc manufacturing apparatus B, where a new optical disc is placed on the transferred base table 3 by way of a rotary motion take out chuck 10.

The upper ultraviolet transmittance plate 1, which was taken out from the optical disc D by the lateral moving take up chuck 8 in the previous process and conveyed to the optical disc manufacturing apparatus B while it was bypassed, is placed on the new optical disc by way of a lateral moving take up chuck 11. The new optical disc is delivered to the optical curing apparatus A, when the new optical disc is subject to the ultraviolet curing process.

The aforementioned processes are repeated.

It is needless to say that the present invention is not limited to the aforementioned embodiment but it can be modified variously to an extent not to deviate from the scope of the invention.

For example, the shape and the number of the ultraviolet irradiators can be varied freely. Further, the shapes of the ultraviolet transmittance plates are not limited to a discoid one but they may be of any shape if they can clamp the optical disc.

As mentioned in detail above, the present invention can prevent the warp phenomenon and effectively cure the optical disc.

What is claimed is:

1. A method of bonding optical disc substrates to create an optical disc including first and second overlaid substrates having an adhesive made of ultraviolet curing resin material interposed therebetween, said method comprising:

clamping said overlaid optical disc substrates between ultraviolet transmittance plates provided at both sides thereof, and curing said adhesive by irradiating same with ultraviolet from outside of said ultraviolet transmittance plates.

2. The method of bonding substrates according to claim 1, wherein the step of curing includes reflecting irradiation toward the periphery of the optical disc substrates so as to cure the periphery of the adhesive.

3. The method of bonding substrates according to claim 1, wherein the step of curing includes the step of moving said optical disc substrates past irradiators so as to expose said adhesive to the irradiation.

4. The method of bonding substrates according to claim 3, wherein the step of moving includes simultaneously rotating said optical disc substrates as the substrates are moved past the irradiators so as to uniformly expose the adhesive to the irradiation.

5. The method of bonding substrates according to claim 1, wherein the step of curing includes supporting the overlaid substrates on adjacent first and second belts, and moving said belts at one of a same velocity so as to nonrotatably move the overlaid substrates past irradiators for curing the adhesive and differing velocities so as to simultaneously rotate and move the overlaid substrates past irradiators for curing the adhesive.

6. The method of bonding according to claim 1, wherein the step of curing includes transmitting at least some of the ultraviolet through the transmittance plates.

7. A method of bonding optical disc substrates to create an optical disc including first and second overlaid substrates having an adhesive made of ultraviolet curing resin material interposed therebetween, said method comprising:

clamping said overlaid optical disc substrates between ultraviolet transmittance plates provided at both sides thereof;

moving said optical disc substrates between ultraviolet irradiators while said optical disc substrates are clamped between said ultraviolet transmittance plates; and curing said adhesive by irradiating same with ultraviolet from outside of said ultraviolet transmittance plates.

8. A method of bonding optical disc substrates according to claim 7, wherein said optical disc substrates are horizontally turned and moved together with said ultraviolet transmittance plates.

9. A method of bonding optical disc substrates according to claim 7, wherein said optical disc substrates are moved together with said ultraviolet transmittance plates while said optical disc substrates and said ultraviolet transmittance plates are placed on a receiving platform.

10. The method according to claim 7, wherein the ultraviolet is supplied from the irradiators and at least some of said ultraviolet is transmitted through the transmittance plates.

11. The method of bonding according to claim 7, wherein the steps of curing includes reflecting irradiation toward a periphery of the optical disk substrates so as to cure the periphery of the adhesive.

\* \* \* \* \*